United States Patent
Palma

(10) Patent No.: US 7,928,677 B2
(45) Date of Patent: Apr. 19, 2011

(54) MOTOR CONTROL CIRCUIT AND METHOD WITH MECHANICAL ANGLE RECONSTRUCTION

(75) Inventor: Marco Palma, Leini' (IT)

(73) Assignee: International Rectifier Corporation, El Segundo, CA (US)

( * ) Notice: Subject to any disclaimer, the term of this patent is extended or adjusted under 35 U.S.C. 154(b) by 561 days.

(21) Appl. No.: 12/105,762

(22) Filed: Apr. 18, 2008

(65) Prior Publication Data

US 2009/0021202 A1    Jan. 22, 2009

Related U.S. Application Data

(60) Provisional application No. 60/912,953, filed on Apr. 20, 2007.

(51) Int. Cl.
*H02P 6/18* (2006.01)
(52) U.S. Cl. ............... 318/400.34; 318/565; 318/432
(58) Field of Classification Search ........... 318/400.34, 318/565, 432
See application file for complete search history.

(56) References Cited

U.S. PATENT DOCUMENTS

| | | | |
|---|---|---|---|
| 7,034,427 B2 * | 4/2006 | Hirzel | 310/191 |
| 7,166,982 B2 * | 1/2007 | Takahashi et al. | 318/568.13 |
| 7,474,069 B2 * | 1/2009 | Palma et al. | 318/432 |
| 7,604,088 B2 * | 10/2009 | Nishizaki et al. | 180/446 |
| 2008/0252244 A1 * | 10/2008 | Palma et al. | 318/400.32 |
| 2008/0265817 A1 * | 10/2008 | Palma | 318/400.35 |

* cited by examiner

*Primary Examiner* — Bentsu Ro
*Assistant Examiner* — Erick Glass
(74) *Attorney, Agent, or Firm* — Farjami & Farjami LLP

(57) ABSTRACT

A method of controlling a motor connected to an unbalanced load in accordance with an embodiment of the present application includes operating the motor for a predetermined period of time with a first performance parameter held constant, monitoring a signal related to a second performance parameter, monitoring electrical rotation within the motor and providing an electrical rotation signal indicative of the electrical rotation angle, sampling the signal related to the second performance parameter at a predetermined angle of electrical rotation, arranging samples provided in the sampling step in predetermined order and generating a mechanical rotation signal representing the mechanical rotation angle of a rotor of the motor based on the arrangement of samples. The mechanical rotation signal is used to control at least one of the first and second performance parameters of the motor.

17 Claims, 7 Drawing Sheets

MOTOR CONTROL CIRCUIT AND METHOD WITH MECHANICAL ANGLE RECONSTRUCTION

CROSS-REFERENCE TO RELATED APPLICATIONS

The present application claims benefit of and priority to U.S. Provisional Patent Application Ser. No. 60/912,953 filed Apr. 20, 2007 entitled DETERMINATION OF MECHANICAL ROTOR ANGLE USING LOAD IMBALANCE, the entire contents of which are hereby incorporated by reference herein.

BACKGROUND

1. Field of the Disclosure

The present invention relates to a motor control circuit and method that determines mechanical rotor position and compensates for noise caused by unbalance loads.

2. Related Art

It is common to use a motor control circuit to control an electric motor. Typically, these control circuits use closed loop control techniques to provide speed and torque control for the motor. One example of such a control circuit is assignee International Rectifier Corporation's IRMCK343. The IRMCK343 is well known and detailed information regarding this circuit is available at irf.com. The IRMCK343 also uses assignee International Rectifier Corporation's well known Motor Control Engine (MCE™) technology, which is described in assignee's U.S. Pat. No. 7,166,982, the entire contents of which are incorporated by reference herein.

While such control circuits provide satisfactory results for most applications, when the motor is used to drive an unbalanced, or eccentric load, vibrations of the load typically result in noise being generated in the feedback signals used by the control circuit to control the motor. For example, when the motor is used to drive a single stroke or double stroke compressor, vibrations of the compressor resulting from the unbalanced nature of the load driven by the drive shaft of the motor, cause oscillations, or ripples, in the speed control loop commonly used by the control circuit for speed control. The oscillations are the result of abrupt variations in the load torque that result from the unbalanced nature of the load. It is undesirable to allow these oscillations in the feedback signals since these oscillations can result in control problems.

Accordingly, it would be desirable to provide a motor control circuit and method that avoids these problems.

SUMMARY OF THE INVENTION

It is an object of the present invention to provide a motor control circuit and method that compensates for ripples in speed and torque signals resulting from an unbalance load.

A method of controlling a motor connected to an unbalanced load in accordance with an embodiment of the present application includes operating the motor for a predetermined period of time with a first performance parameter held constant, monitoring a signal related to a second performance parameter, monitoring electrical rotation within the motor and providing an electrical rotation signal indicative of the electrical rotation angle, sampling the signal related to the second performance parameter at a predetermined angle of electrical rotation, arranging samples provided in the sampling step in predetermined order and generating a mechanical rotation signal representing the mechanical rotation angle of a rotor of the motor based on the arrangement of samples. The mechanical rotation signal is used to control at least one of the first and second performance parameters of the motor.

A control circuit for a motor in accordance with an embodiment of the present application includes a first control unit operable to hold a first performance parameter of the motor constant for a predetermined period of time, a second control unit operable to monitor a second performance parameter of the motor, a electrical rotation monitoring unit operable to monitor electrical rotation in the motor and to provide an electrical rotation signal indicative of the electrical rotation angle, a sampling device, operable to sample the signal related to the second performance parameter at a predetermined angle of electrical rotation and to arrange samples in a predetermined order; and a mechanical rotation control unit operable to generate a mechanical rotation signal representing the mechanical rotation angle of a rotor of the motor based on the arrangement of samples. The mechanical rotation signal is used to control at least one of the first and second performance parameters of the motor.

Other features and advantages of the present invention will become apparent from the following description of the invention which refers to the accompanying drawings.

BRIEF DESCRIPTION OF THE DRAWING(S)

DETAILED DESCRIPTION

As is noted above, when a motor is connected to an unbalance load, such as the single stroke compressor mentioned above, vibrations of the load result in undesirable ripples in the feedback speed and/or torque signals used by the control circuit to control the motor. While these ripples represent a problem for control, the control circuit of the present application proposes utilizing these ripples in order to determine the exact mechanical rotation angle of the motor, and in turn, to provide a reference signal with an offset that corrects the ripples or oscillations resulting from the unbalance load.

Figure 1:
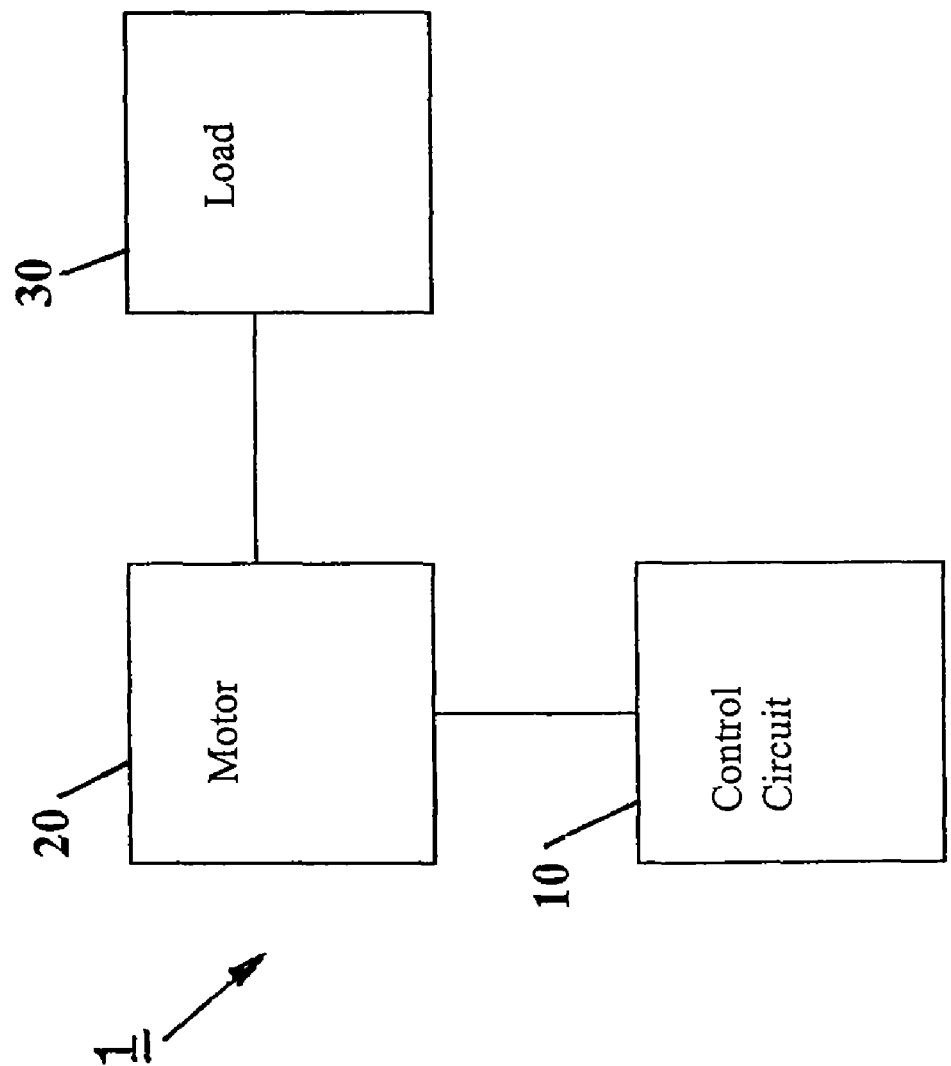
FIG. 1 is a block diagram illustrating an exemplary embodiment of a motor control system utilizing the motor control circuit of the present application.

In a preferred embodiment, the motor control circuit 10 of the present application is suitable for use in the motor control system 1 generally illustrated in FIG. 1. The control circuit 10 is connected to a motor 20 that is used to drive unbalance load 30. The unbalanced load 30 may be a single or double stroke compressor, for example, or any other unbalanced load.

Figure 2:
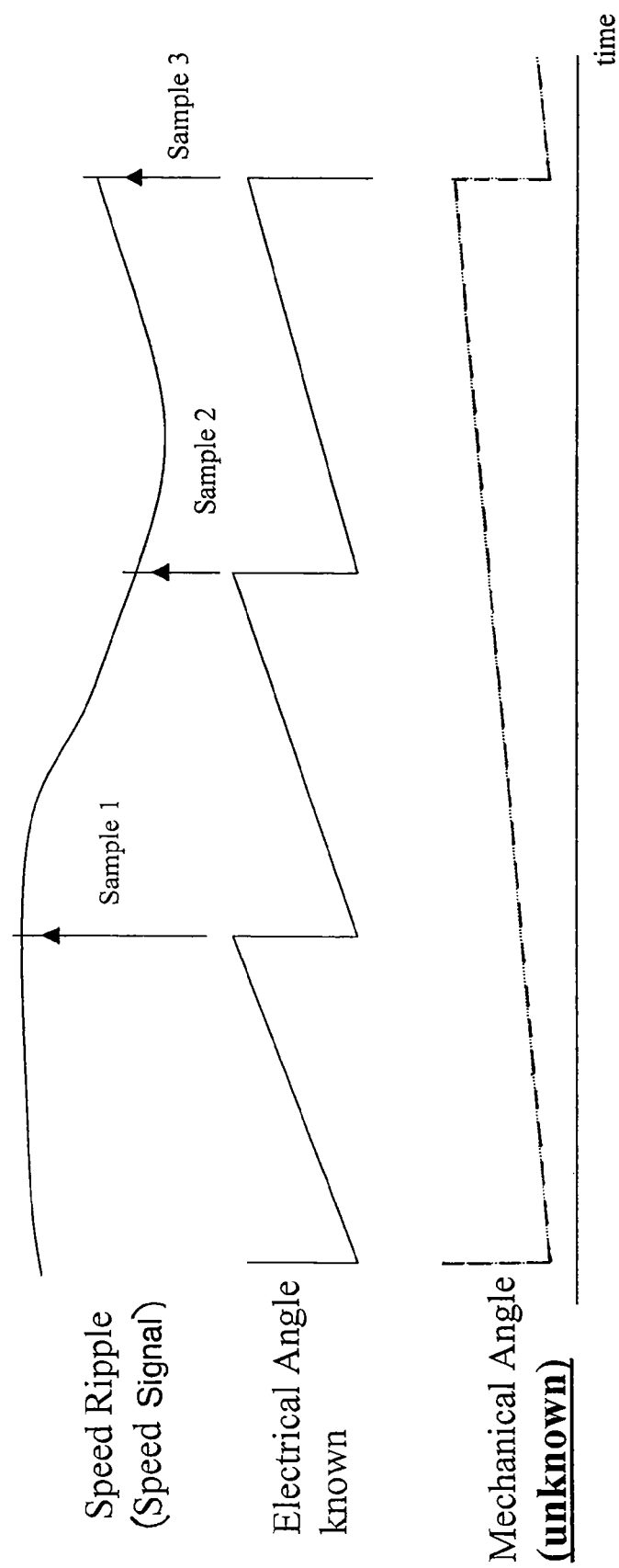
FIG. 2 is a graph illustrating oscillations in a feedback speed signal resulting from an unbalance load.

In a preferred embodiment, the motor 20 is controlled by the control circuit 10 at a slow speed initially. During this time, a constant torque is maintained for the motor 10. As illustrated in the graph of FIG. 2, while the torque is held constant, the speed signal (speed ripple) is sampled during every electrical cycle at a precise angle, for example, 0 degrees as shown in FIG. 2. In this case, three samples are taken, because the exemplary motor 20 includes three sets of magnetic pole pairs. It is noted that in any particular motor, the number of pole pairs will dictate the number of electrical rotation cycles necessary to complete one mechanical rotation. Based on the samples, a fixed reference can be obtained to provide a mechanical angle reference value that is constant. This Mechanical Angle reference is indicated as unknown in FIG. 2, but is reconstructed in FIG. 3. The mechanical angle reference does not change since it is based on the shape of the unbalance load. Thus, an absolute mechanical reference signal is provided without the need for external sensors. It is noted that in the alternative, the speed may be kept constant while the torque signal is monitored and sampled like the speed signal in a manner similar to that described above.

Figure 3:
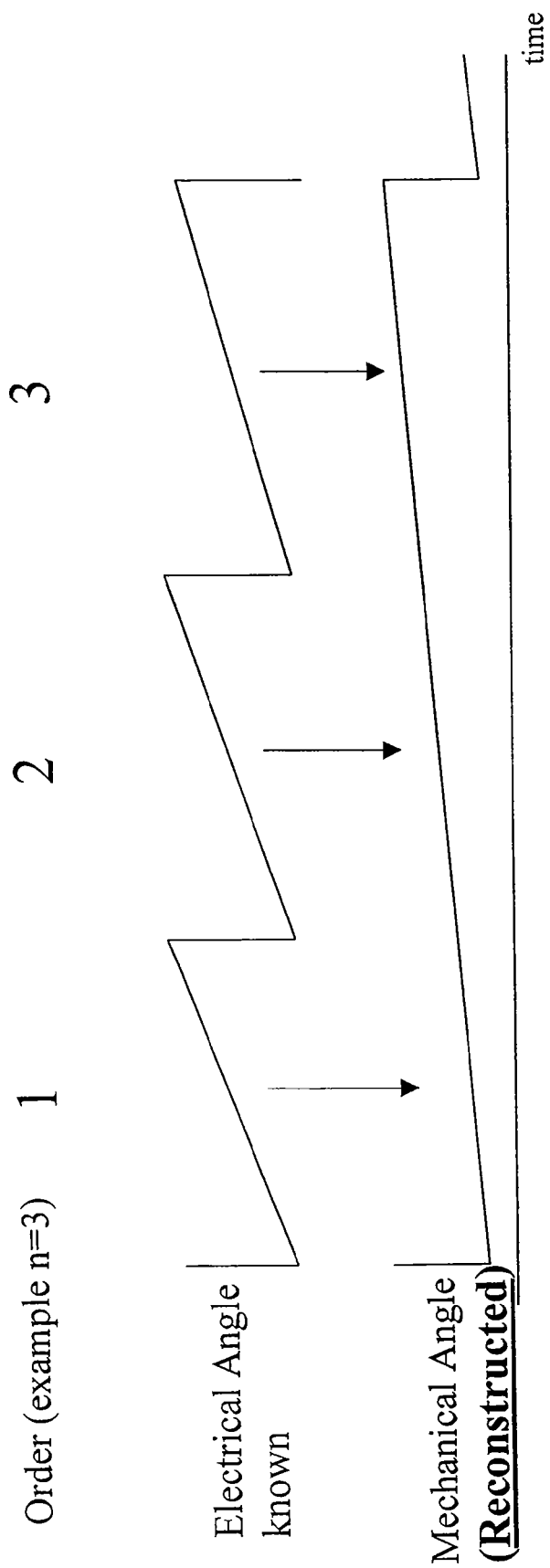
FIG. 3 is a graph illustrating the sampling of the speed signal of FIG. 2.

As noted above, in a motor with n pole pairs, n electrical rotations are required to provide one mechanical rotation. Thus, in a motor with 3 pole pairs (total of 6 poles) there will be three electrical rotations for every one mechanical rotation. Since motor 20 includes three pole pairs and a sample is taken during each electrical rotation, three samples are taken to determine the mechanical rotation. The samples are ordered, or arranged, such that the sample with the highest value is positioned first, and thereafter, the remaining samples are provided. A signal (Mechanical Angle) representing the mechanical rotation angle of the rotor of the motor is then reconstructed based on the sample values as can be seen in FIG. 3, for example.

After the Mechanical Angle signal is reconstructed based on the samples of the speed signal, no additional sampling is necessary. The Mechanical Angle is associated with the exact order of the n electrical turns such that the mechanical angle of the rotor can always be determined based on the electrical angle information. Further, once this mechanical angle reference is determined, a reference offset signal may be injected into the system to adjust for the speed ripple (or the torque ripple) caused by the unbalance load. This signal may be of any suitable waveform and is in phase with the mechanical angle of the rotor of the motor 20. The user can adjust the magnitude and phase, as desired.

Figure 4:
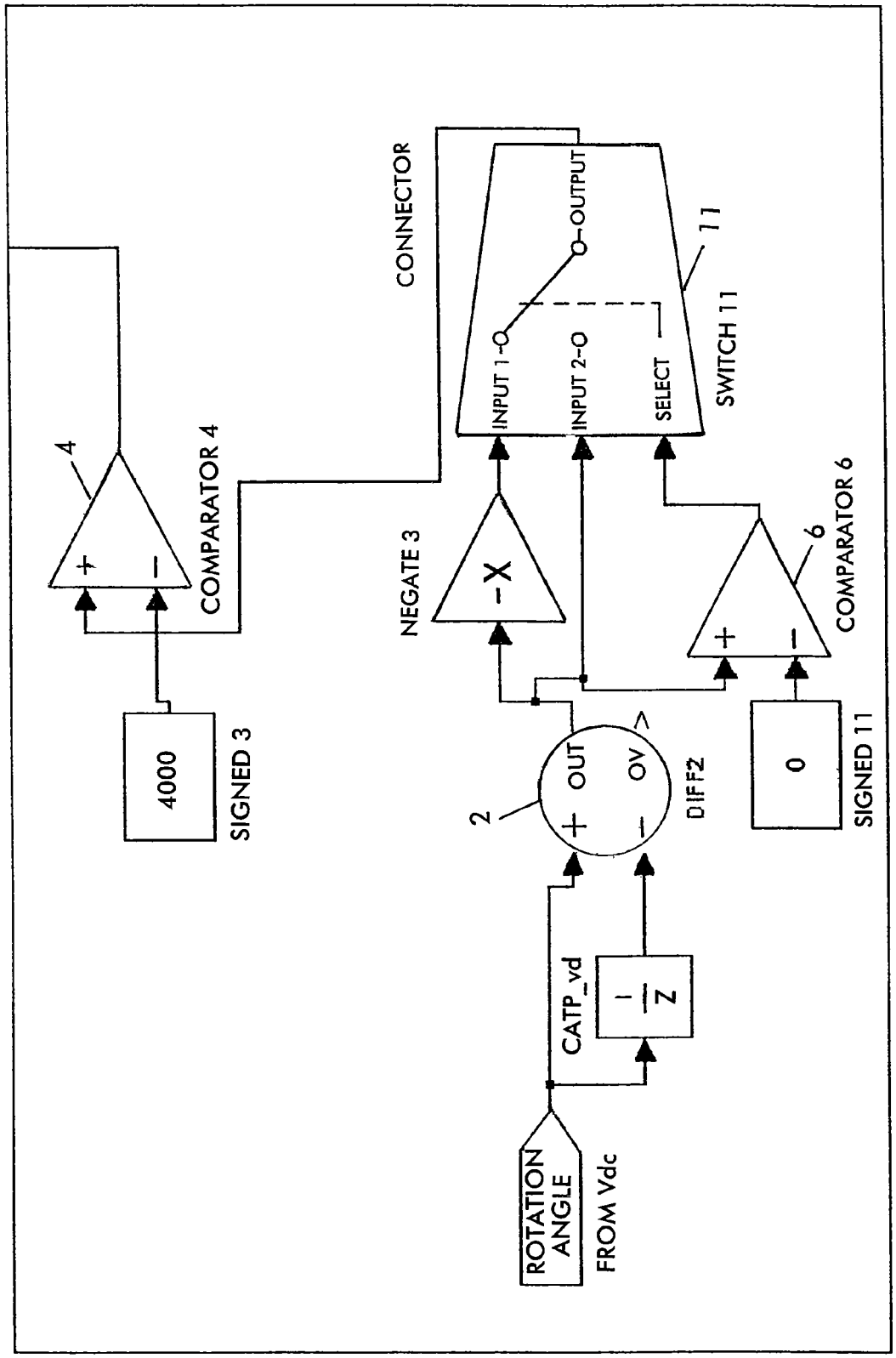
FIG. 4 is an exemplary block diagram of a first portion of the control circuit of the present application.

FIG. 4 is a block diagram of a portion 10a of the control circuit 10. The signal RotatorAngle is representative of the electrical rotation within the motor 20. The RotatorAngle signal may be obtained in any desirable manner, for example, using Hall sensors in the motor 20 or using a sensorless technique. The RotatorAngle signal is preferably a 12 bit unsigned signal which spans values between 0 and 4095. Thus, the electrical angle range (−180 degrees to +180 degrees) is expressed as a value between 0 and 4095. In the embodiment of FIG. 4, the 3 pole pair motor 20 is used, thus three electrical rotations are needed to provide one mechanical rotation. The circuit 10a includes components that are used to recognize the wind-up of the RotatorAngle signal. The wind up is considered valid if the difference between the previous value and the present value is more than 4000counts. Comparator 4 makes this comparison. In order to do so, the difference between the present value and the past value of the RotatorAngle is determined by difference circuit 2. A sign is assigned to the resulting signal via the switch 11 and the result is compared to 4000 at the comparator 4.

Figure 5:
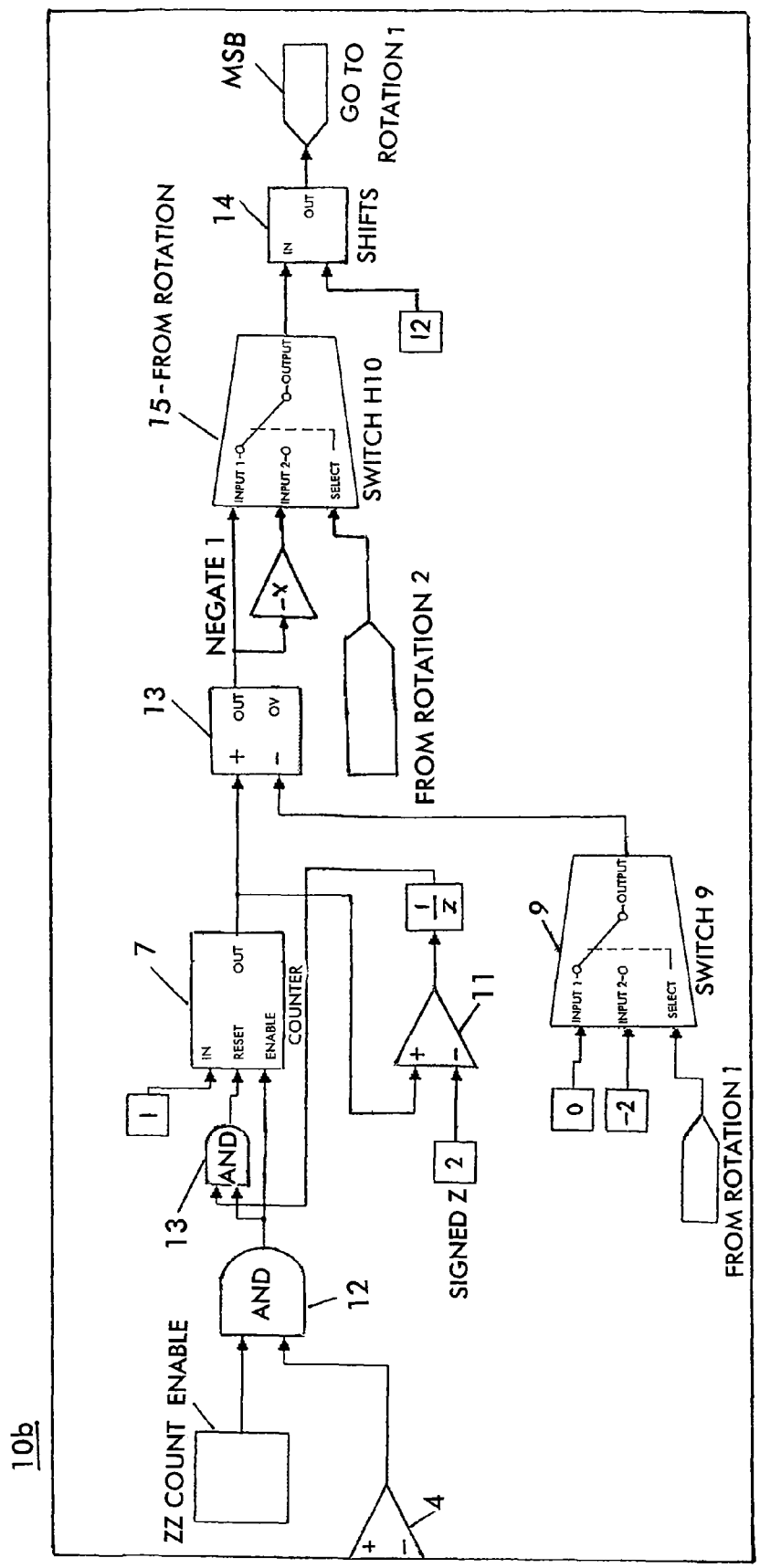
FIG. 5 is an exemplary block diagram of a second portion of the control circuit of the present application.

As can be seen in FIG. 5, which illustrates another portion 10b of the control circuit 10, the output of the comparator 4 is provided to a counter 7 that counts from 0 to 2 in ascending or descending order depending on the RotatorAngle count direction. That is, the counter counts the number of electrical cycles and thus, the number of samples to be taken. If the motor 20 included a different number of pole pairs, the counter would count to that number. The signal ZZCountEnable is used to enable the counter 7 via a first AND gate 12. The ascending or descending order of the count depends on the real motor rotation direction. Thus, in FIG. 5, additional components are provided to add two most significant digits to the RotatorAngle signal such that the resulting signal MSB has a value in the range between 0 and 12887. These components include the switch 9, the summing circuit 13, the switch 10, and shift device 14. The comparator 11 is used with the second AND gate 13 to set the count limit of the counter 7.

Figure 6:
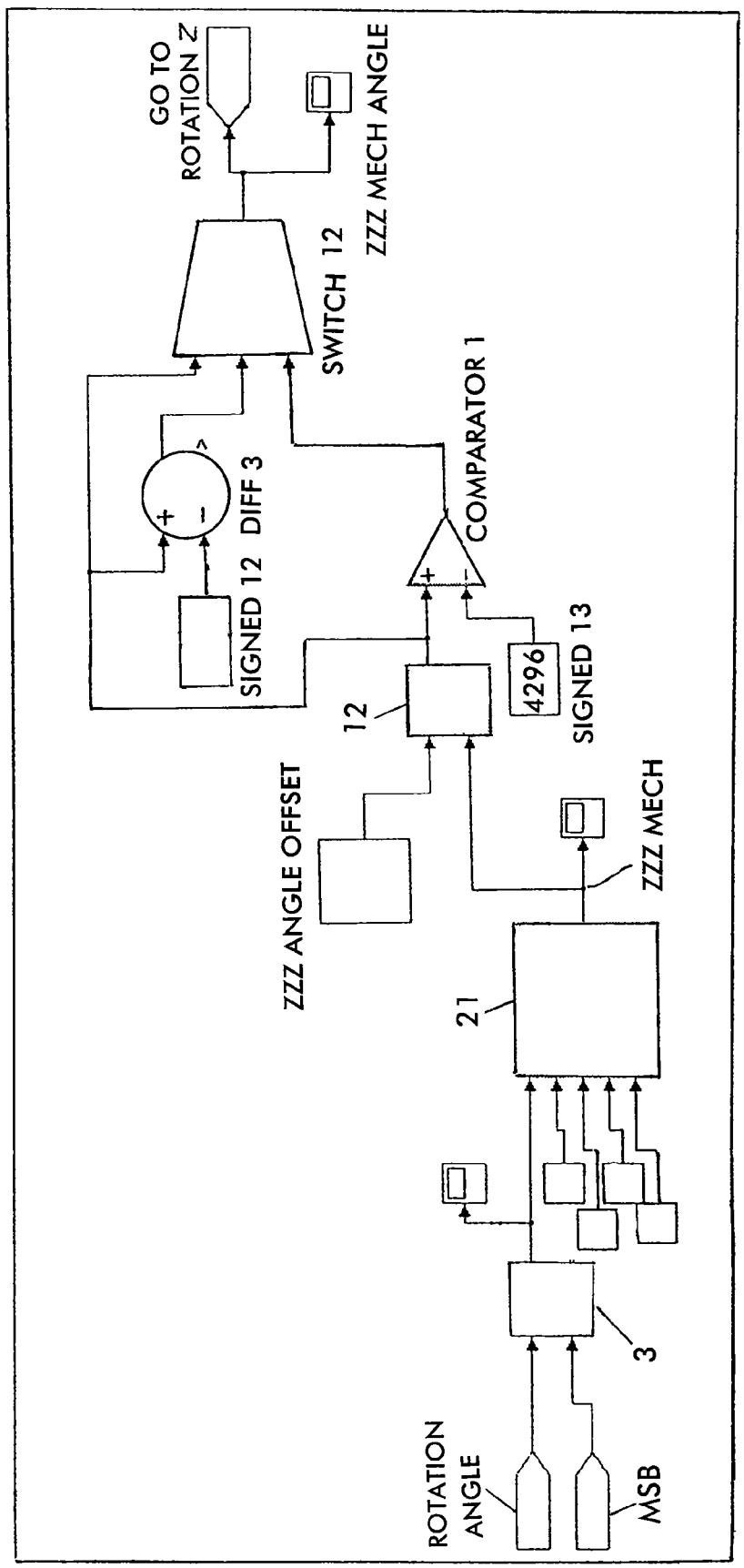
FIG. 6 is an exemplary block diagram of a third portion of the control circuit of the present application.
Figure 7:
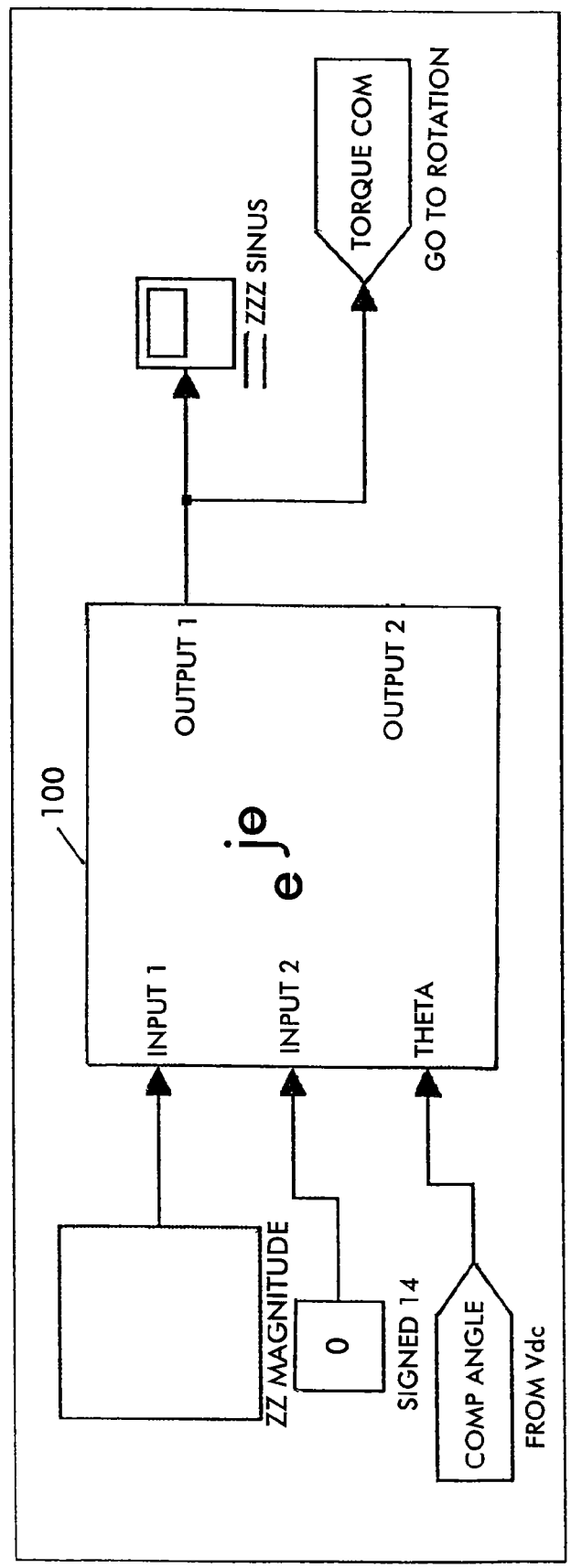
FIG. 7 is an exemplary block diagram of another portion of the control circuit of the present application.

As can be seen in FIG. 6, which displays another portion 10c of the control circuit 10, the MSB signal from FIG. 5 is added to the RotatorAngle signal in the summing circuit 3. The signal represents the two most significant bits of the Mechanical Angle signal which is itself obtained based on the summing of the MSB signal and the RotatorAngle signal from the summing circuit 3. To convert this output signal back into an unsigned 12 bit signal, a multiplication function followed by a right shift operation is provided (12288*5461/16384=4096) The multiplying circuit 21 is provided for this purpose. The resulting signal ZZZMechAngle is added to unsigned 12 bit offset signal ZZAngleOffset via the summing circuit 12 and bound back again to an unsigned 12 bit signal with a value between 0 and 4095. The signal ZZAngleOffset is used by the user to provide a signal with the same mechanical frequency as the rotor and the desired offset. The value of this signal is between 0-4095 with each value representing an angle between 360 degrees and 0 degrees of phase delay.

The Mechanical Angle signal plus the offset signal are preferably provided to the vector rotator block 100 which is illustrated in another portion 10d of the control circuit 10. The rotator block generates a constant waveform signal (ZZZSinus) with a magnitude set by the user via parameter ZZMagnitude. The representation of the ZZMagnitude signal is preferably the same as that of the torque reference signal TrqRef. The two signals TrqRef and ZZZSinus (constant waveform signal) are summed to create a final TorqueReference signal. This torque reference signal is then used to provide closed loop torque control in a conventional manner. That is, this final torque reference signal is the reference value used in the torque control loop. The torque reference signal takes into account the ripples in the feedback signals caused by the unbalanced load and adjusts for them.

In a preferred embodiment, the bandwidth of the closed loop speed control is reduced and the speed feedback is preferably filtered to allow determination of an average torque setpoint based on the closed loop speed control. Compensation of the load torque on a cycle by cycle basis is provided by a feed forward compensator in a known manner.

In this manner, the control circuit 10 and the method used thereby can control the motor 20 to provide desired speed and torque characteristics using conventional techniques even where the unbalanced load results variations in load torque. Indeed, the unbalanced nature of the load is used by the control circuit to determine the mechanical rotation of the motor and also to provide a suitable offset to account for the noise introduced to the feedback signals due to uneven nature of the load.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of controlling a motor connected to an unbalanced load comprising:

operating the motor for a predetermined period of time with a first performance parameter held constant;

monitoring a signal related to a second performance parameter;

monitoring electrical rotation within the motor and providing an electrical rotation signal indicative of the electrical rotation angle;

sampling the signal related to the second performance parameter at a predetermined angle of electrical rotation;

arranging samples provided in the sampling step in predetermined order; and generating a mechanical rotation signal representing the mechanical rotation angle of a rotor of the motor based on the arrangement of samples, wherein the mechanical rotation signal is used to control at least one of the first and second performance parameters of the motor.

2. The method of claim 1, further comprising providing a constant waveform offset signal based on the mechanical rotation signal, wherein the offset signal is in phase with the mechanical rotation angle of the rotor of the motor.

3. The method of claim 2, further comprising adding the constant waveform offset signal to a reference signal related to one of the first performance parameter and the second performance parameter to provide a final reference signal for use in closed loop control of the first performance parameter or the second performance parameter.

4. The method of claim 3, wherein the step of monitoring electrical rotation includes positioning Hall sensors in the motor and generating the electrical rotation signal based on measurements of the Hall sensors.

5. The method of claim 3, wherein the step of monitoring electrical rotation includes determining the electrical rotation based on a mathematical model.

6. The method of claim 4, wherein the sampling step further comprises taking a predetermined number of samples of the signal related to the second performance parameter, wherein the predetermined number is based on a number of magnetic pole pairs used in the motor.

7. The method of claim 6, wherein the predetermined period of time during which the motor is operated with the first performance parameter held constant is based on a number of electrical rotations cycles necessary to complete one mechanical rotation of the rotor of the motor.

8. The method of claim 7, wherein the predetermined order of the samples positions a highest value sample first.

9. A control circuit for a motor comprising:
a first control unit operable to hold a first performance parameter of the motor constant for a predetermined period of time;
a second control unit operable to monitor a second performance parameter of the motor;
an electrical rotation monitoring unit operable to monitor electrical rotation in the motor and to provide an electrical rotation signal indicative of the electrical rotation angle;
a sampling device, operable to sample the signal related to the second performance parameter at a predetermined angle of electrical rotation and to arrange samples in a predetermined order; and
a mechanical rotation control unit operable to generate a mechanical rotation signal representing the mechanical rotation angle of a rotor of the motor based on the arrangement of samples, wherein the mechanical rotation signal is used to control at least one of the first and second performance parameters of the motor.

10. The control circuit of claim 9, wherein the mechanical rotation control unit provides a constant waveform offset signal based on the mechanical rotation signal, wherein the offset signal is in phase with the mechanical rotation of the rotor of the motor.

11. The control circuit of claim 10, further comprising an adding unit operable to add the constant waveform offset signal to a reference signal used to control one of the first performance parameter and the second performance parameter to provide a final reference signal for use in closed loop control of the first performance parameter or the second performance parameter.

12. The control circuit of claim 11, wherein the electrical rotation monitoring unit further comprises a plurality of Hall sensors positioned in the motor such that the electrical rotation signal is based on measurements of the Hall sensors.

13. The control circuit of claim 11, wherein the electrical rotation monitoring unit includes a calculation unit operable to determining the electrical rotation based on a mathematical model.

14. The control circuit of claim 12, wherein the sampling unit takes a predetermined number of samples of the signal related to the second performance parameter, and wherein the predetermined number is based on a number of magnetic pole pairs used in the motor.

15. The control circuit of claim 14, wherein the predetermined period of time during which the motor is operated with the first performance parameter held constant is based on a number of electrical rotations cycles necessary to complete one mechanical rotation of the rotor of the motor.

16. The control circuit of claim 15, wherein the predetermined order used by the sampling unit positions a highest value sample first, followed by the next highest value sample.

17. The control circuit of claim 16, wherein the mechanical rotation control unit further comprises a vector rotator.

* * * * *